Feb. 8, 1949. G. W. BORNQUIST 2,461,136
CONTROL VALVE
Filed Dec. 27, 1943
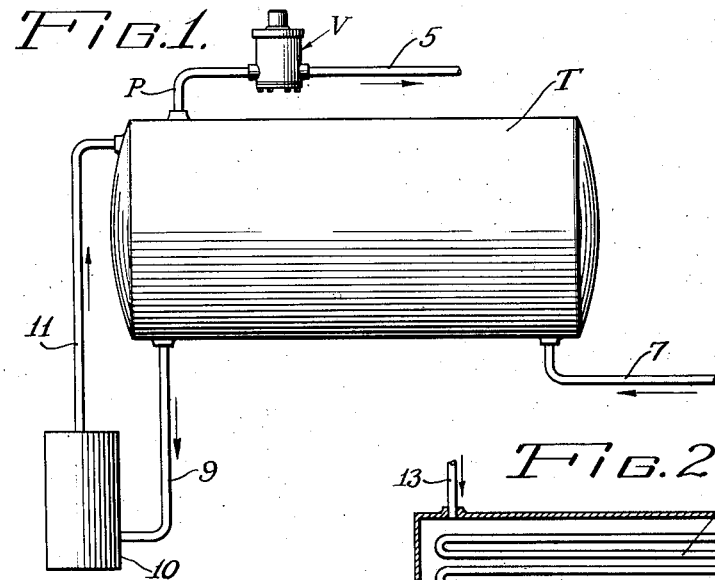
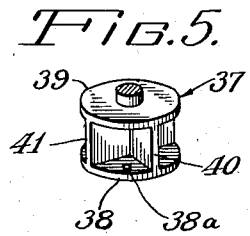
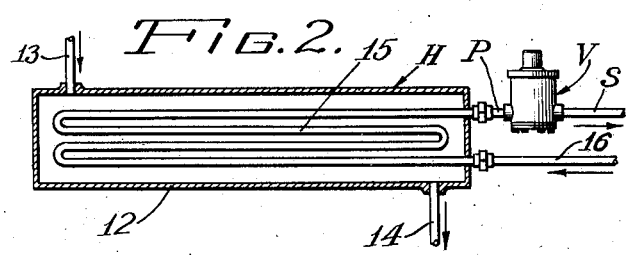
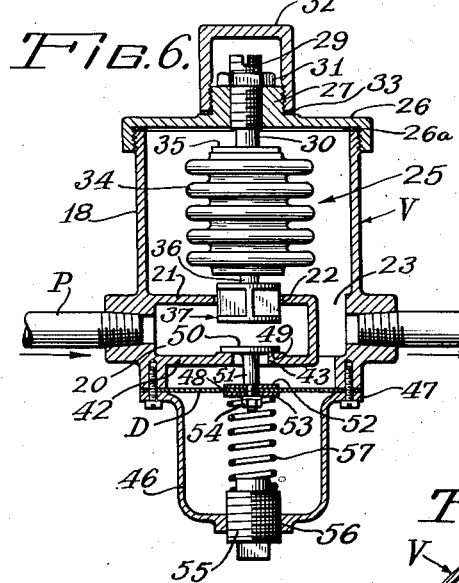
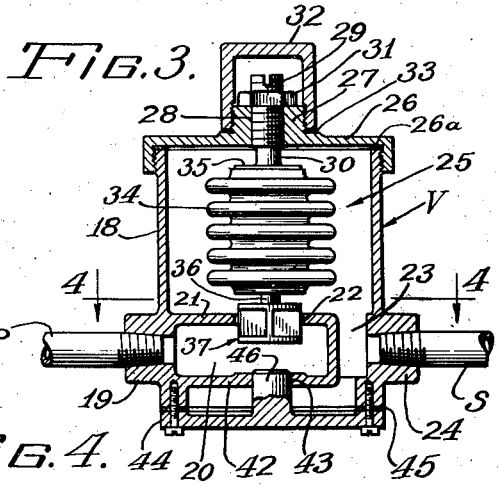
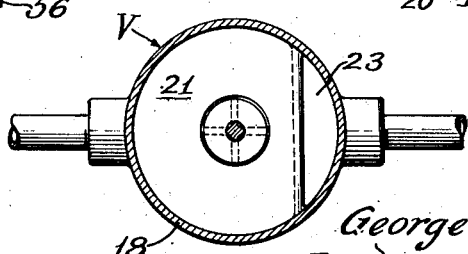
Inventor:
George W. Bornquist
By Wallace and Cannon
Attorneys Patented Feb. 8, 1949

2,461,136

UNITED STATES PATENT OFFICE 2,461,136

CONTROL VALVE

George W. Bornquist, Oak Park, Ill.

Application December 27, 1943, Serial No. 515,755

7 Claims. (Cl. 236—92)

This invention relates to control valves of a character particularly adapted for use with hot water heating systems and the like.

Two systems are in common use for heating water and the like, one of which is the so-called storage tank system and the other of which is the so-called instantaneous heater system. The present invention may be used advantageously with either system.

In the storage tank water heating system cold water is usually introduced into a tank near one end thereof and the heated water is withdrawn from the tank usually adjacent the other end thereof and a heating system is provided through which water or steam is circulated from and to the tank to pass through a heating plant. It has been observed, however, in the use of such systems in some instances the demand for hot water may be such that water from the cold water inlet will pass through the tank directly from such inlet to the hot water outlet with the result that the heating system associated with the tank is, in effect, short circuited and cold rather than hot water is supplied to the distributing system.

Moreover, in the so-called instantaneous heater systems there may be instances where the demand for hot water will exceed the capacity of the heater, which is to say, the demand for water will be such that water will so quickly pass through the heater that it will not be raised to the desired temperature and in this instance cold water or water below the desired temperature will be supplied to the distributing system.

In view of the foregoing, it is among the objects of this invention to restrict the flow of water to a hot water distributing system in those instances where the water flowing to such a system has not been heated to a desired temperature so that the flow of water heated to less than a desired temperature to the system may be avoided. Thus, for example, if a container is to be filled with hot water from a hot water distributing system it will be preferable that the flow of water from the system be at a rate slower than normal wherefore a greater time be required to fill the container than would ordinarily be required if this will insure that the container will be filled with water heated to the desired temperature rather than to have water heated to less than the desired temperature supplied to the container at a normal rate and another object of this invention is to enable this to be realized in a novel and efficacious manner.

Yet another object of this invention is to introduce into the supply line to a hot water distributing system a valve arrangement which will function to restrict the flow of water to the distributing system in the event the temperature of the water falls below a predetermined temperature; to include a temperature responsive means in a valve of the aforesaid character which will control the relation of a valve member to a cooperating valve seat or guide in such a way as to restrict the flow of water past the valve seat in the event temperature of the water falls below a predetermined minimum; to enable an arrangement of the aforesaid character to be expeditiously adjusted to assure functioning thereof in the intended manner; and to facilitate assembly and servicing of a valve arrangement of the aforesaid character.

In many instances it may be desirable to insure that at least a predetermined pressure will be maintained in a distributing system of the aforesaid character irrespective of whether or not the temperature of the water distributed through such a system is maintained above a predetermined minimum and to enable this to be accomplished in association with a valve arrangement of the character to which this invention pertains is yet another object of this invention and objects related to the foregoing are to associate with a temperature responsive valve arrangement, of the character to which this invention pertains, a pressure responsive valve arrangement which will function to admit water to a distributing system directly from a supply line whenever the pressure in the distributing system falls below a predetermined minimum; to enable a pressure responsive valve arrangement of the aforesaid character to be directly associated with a temperature responsive valve arrangement of the aforesaid character; to so arrange a pressure responsive valve arrangement of the aforesaid character that adjustment thereof to meet required conditions may be expeditiously effected; and to so arrange a temperature responsive valve arrangement of the aforesaid character that a pressure responsive valve arrangement may be optionally associated therewith or omitted therefrom.

Other and further objects of the present invention will be apparent from the following description and claims and will be understood by reference to the accompanying drawing which, by way of illustration, shows preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawing:

Fig. 1 is a partially diagrammatic view showing one manner in which the novel control valve of my invention may be associated with a storage tank type of hot water heating system;

Fig. 2 is a partially diagrammatic view of one type of instantaneous hot water heating system and showing the manner in which my novel control valve may be associated with this type of system;

Fig. 3 is a vertical sectional view of the novel temperature responsive valve arrangement of my invention;

Fig. 4 is a horizontal sectional view taken substantially on the line 4—4 on Fig. 3;

Fig. 5 is a perspective detail view of the valve member employed in the valve arrangement as shown in Fig. 3; and Fig. 6 is a vertical sectional view, similar to Fig. 3, but showing a pressure responsive valve associated with the novel temperature responsive valve of this invention.

The novel control valve of my invention may be advantageously utilized with either a so-called storage tank water heating system or with a so-called instantaneous water heating system and among the advantages of this invention is that the construction of my novel valve may be utilized with either of such systems.

Thus in Fig. 1 I have shown a storage tank T which has a cold water inlet 7 directed thereinto adjacent one end thereof and which has a hot water outlet pipe P lead therefrom adjacent the other end thereof. In the present instance a pipe 9 leads from the tank T to a heating plant 10 and a pipe 11 leads from the heating plant 10 back to a tank T. The heating plant 10 may be of any desired type, and will include a coil or the like associated with the source of heat. In any event the arrangement will be such that water from the pipe 9 will pass through the heating plant as 10 to be heated prior to the time it flows back to the tank T through the pipe 11.

In Fig. 2 I have illustrated a so-called instantaneous heater H of the type which includes a shell or housing 12 which, in the present instance, has an inlet pipe 13 directed thereto adjacent one end thereof and an outlet pipe 14 lead therefrom adjacent the other end thereof. A coil 15 is disposed within the shell 12 and a cold water inlet pipe 16 is lead to the inlet of the coil 15 and a hot water outlet pipe P leads from the outlet end of the coil. In the type of heater H illustrated in Fig. 2 steam or hot boiler water or the like is directed into the shell 12 through the pipe 13 and passes therefrom through the pipe 14 and while passing through the shell 12 is effective to heat water flowing through the coil 15. It will be understood that resort might be had to other types of so-called instantaneous heaters including a coil as 15 or other arrangement to which heat may be directly supplied from a fire or other source of heat without departing from the ambit of my invention and that, therefore, the heater H as shown in the accompanying drawing is merely illustrative of a so-called instantaneous heater.

By referring to Fig. 1 it will be seen that a valve V is mounted in the outlet line P leading from the tank T. Also by referring to Fig. 2 it will be seen that a valve V is mounted in the outlet pipe P leading from the coil 15. My invention has to do with a valve as V which, it will be seen, is included in the supply pipe of a hot water distributing system as S.

My novel valve as V is illustrated in Figs. 3 and 4 and by referring thereto it will be seen that this valve, as there illustrated, includes a cylindrical housing 18 having an inlet 19 to which a hot water supply pipe as P is connected. The inlet 19 opens into a chamber 20 which includes a wall 21 in which a valve seat or guide 22 is formed, the wall 21 desirably extending transversely but not entirely across the housing 18 whereby an outlet passage 23 is defined which leads to an outlet 24 to which a hot water distributing system as S is connected. Thus, in normal operation, hot water from a pipe as P flows into the chamber 20 and past the valve seat or guide 22 and thence through the outlet 23 to a distributing system as S and in so doing the water will flow through a chamber 25 in the housing 18.

The upper end of the housing 18 is closed by a cap as 26, including a gasket 26a, which is screw-threadedly or otherwise suitably connected to the housing 18 and which includes a centrally located externally threaded boss as 27. A tapped opening 28 extends medially through the boss 27 and cap 26. An adjusting screw 29 is threaded through the tapped opening 28 and includes a stem 30 which extends into the chamber 25. The screw 29 may be locked in an adjusted position by a lock nut 31 and the nut and extending end of the screw may be enclosed within a removable cover 32 threaded onto the boss 27. A gasket 33 may be arranged between the cover and cap so as to provide an hermetic seal to prevent leakage.

A closed metallic bellows 34 is disposed within the chamber 25 and includes a plate 35 at the upper end thereof which is suitably connected to the lower end of the stem 30 so that the bellows 34 is supported by the adjusting screw 29. A stem 36 depends from the lower end of the bellows 34 and a valve member 37 is suitably connected to the free end of this stem 36.

As best shown in Fig. 5 the valve member 37 includes two circular plates 38 and 39 spaced apart and interconnected by right angularly related webs 40 and 41, the free ends of the webs 40 and 41 desirably being aligned with the peripheries of the discs 38 and 39.

In initially assembling the valve and prior to the time hot water is caused to flow through the chambers 20 and 25, the adjusting screw 29 is manipulated to dispose the plate 38 of the valve 37 in juxtaposition to the valve seat 22. This arrangement is such that when hot water flows through the chambers 20 and 25, to be effective on an expansible fluid enclosed in the bellows 34, as will be explained presently, the bellows will expand to dispose both plates 38 and 39 and the valve member 37 out of association with the valve seat or guide 22 so that flow of water past the valve seat 22 will be relatively unrestricted. The free edges of the webs 40 and 41, as well as the peripheries of the discs 38 and 39, are preferably spaced from the wall of the valve seat or guide 22 so as to enable flow thereby under all circumstances, but the relation of the free edges of the webs 40 and 41 and the peripheries of the discs 38 and 39 to the valve seat 22 is such that the valve seat 22 will serve as a guide to the valve 37 in the course of movement thereof in response to the temperature of the water flowing through the chamber 25 to be effective on the bellows 34 and the fluid therein. If desired one or more bleed ports 38a may be provided in the disc 38 to insure the flow of some water at all times.

Prior to the time the bellows 34 is sealed a suitable quantity of an expansible fluid such as ethyl chloride or the like is introduced thereinto. The particular fluid selected and the quantity thereof introduced into the bellows and the initial relation of the valve 37 to the valve seat or guide 22 will be such that the bellows will be expanded to dispose the discs 38 and 39 away from the valve seat or guide 22 so long as hot water flows through the chamber 25. However, when water heated to less than a desired temperature flows into the chamber 25, the fluid in the bellows 34 and this bellows will contract and thereby dispose the disc 38 in position to restrict the flow of water past the valve seat 22. Thus, the expansible fluid chosen and the initial adjustment of the metallic bellows 34 and valve 37 are so related that so long as hot water flows through the chamber 25 the valve 37 will be positioned relative to the valve seat 22 so as to permit unrestricted flow of water from the chamber 20 to the chamber 25. When, however, because a relatively high demand in the system S, or for other reason, the temperature of the water flowing from the chamber 20 into the chamber 25 falls below a predetermined minimum, the fluid within the bellows 34 will cause the bellows to contract so as to thereby move the disc 38 of the valve 37 into such relation with the valve seat 22 that the flow of water from the chamber 20 to the chamber 25 will be materially restricted and this restricts the flow of water to a system as S. I found that such restriction in the flow of water from a pipe as P will in most instances enable heating of the water to the desired temperature so as to thereby avoid supplying relatively cold water to a system as S.

The chamber 20 includes a wall 42 which in the present instance is arranged in parallel relation with the wall 21 and the wall 42 has an opening 43 formed therein. A plate 44 is bolted or otherwise suitably secured to the lower end of the housing 18 over a gasket 45 and includes a boss 46 which, when the plate 44 is in closing position relative to the lower end of the housing 18, extends into and closes the opening 43 so as to prevent the flow of water admitted into the chamber 20 through the opening 43.

In some instances it may be that the restriction of flow of water from the chamber 20 into the chamber 25, in the manner above described, will cause an objectionable reduction in pressure in the system S. In such instances and particularly where it is desired that at least a predetermined pressure be maintained in the system S resort may be had to the arrangement shown in Fig. 6 where a pressure responsive valve is shown in association with the hereinabove described temperature responsive valve.

Thus, in those instances where it is desired that at least a predetermined pressure be maintained at all times in a system as S the cap 44, shown in Fig. 2, is supplanted by a casing 46 which is bolted or otherwise suitably secured to the lower end of the housing 18 and in such instances a diaphragm D is clamped between the flange 47 of the casing 46 and the lower end of the housing 18, the portion of the diaphragm D that is thus disposed within the casing 46 desirably being imperforate except for a medially located opening 48 therein.

Moreover, a valve seat 49 is desirably formed about the end of the opening 43 in the chamber 20 and a valve member 50 is disposed for cooperation with the valve seat 49. The stem 51 of the valve member 50 has a plate 52 thereon and includes a threaded stem of reduced diameter relative to the stem 51 that is passed through the plate 52 and the opening 48 and through an opening in a plate 53. The arrangement is such that a portion of the diaphragm D about the opening 48 is disposed between the plates 52 and 53 and by properly positioning a nut 54 on the threaded portion of the stem 51 leakage through the opening 48 in the diaphragm D is prevented.

An adjusting screw 55 is mounted in a tapped opening 56 at the lower end of the casing 46 and a spring 57 extends between the screw 55 and the plate 53. The tension of the spring 57 is so adjusted by manipulation of the screw 55 that so long as the pressure of water flowing through the chamber 20 into the chamber 25 and out through the passage 23 and pipe S, to be effective on the diaphragm D, is about a predetermined limit, the valve member 50 will remain in engagement with the valve seat 49. When, however, due to the relation of the valve member 37 to the valve seat or guide 22, or for any other reason, pressure in the system S falls below the aforesaid predetermined minimum then the spring 57 becomes effective to move the valve member 50 away from the valve seat 49 and thereupon water may flow directly from the pipe P, into the chamber 20 and through the opening 43 to the passage 23 and into the system S. In such instances it may well be that the temperature of water admitted into the system S will not be that which would otherwise be admitted to this system under control of the valve 37, but since in those instances where resort is had to a pressure responsive valve at 50 it is desirable that a predetermined pressure be maintained in the system S, it will be manifest that this result will be realized by resort to the arrangement illustrated in Fig. 6.

It will be manifest from the foregoing description that, except in those instances where it is desired that at least a predetermined pressure be maintained in the system S, resort will be desirably had to the arrangement of my novel valve as shown in Fig. 3. Where, however, upon installation of such a valve arrangement it is ascertained that there is an objectionable pressure drop in the system S or where for any reason it is desired that at least a predetermined pressure always be maintained in a system as S, then resort may be expeditiously had to the arrangement shown in Fig. 6. In such circumstances, as explained hereinabove, it is only necessary to replace the cap 44 with the casing 46 and to arrange the valve member 50 for cooperation with the valve seat 43 for, in other respects, the arrangement of my novel control remains unchanged.

A feature of the present valve structure and particularly of the temperatue and pressure responsive valve disclosed in Fig. 6 is the simplicity of assembly. Thus the pressure responsive valve disc 50 has a diameter slightly less than the diameter of the valve opening 22 in the wall 21 so that during assembly and before the cap 26 and the bellows and valve assembly 34—37 are mounted in place, the valve disc 50 may be inserted through the valve opening 22 and held while its stem 51 is attached to the diaphragm D.

It will be manifest from the foregoing description that a control valve embodying my invention will enable the hereinabove set forth and related objects to be realized and, therefore, while I have illustrated and described selected embodiments of my invention, it is to be understood that these are capable of variation and modification and I therefore do not wish to be limited to the precise details set forth but desire to avail myself of such changes and alterations as fall within the purview of the following claims.

I claim:

1. A valve structure comprising a substantially tubular housing open at its ends, a removable cap on one end of said housing, a fluid inlet chamber within said housing including spaced walls each having an opening therein communicating with an outlet chamber within said housing, a valve member to cooperate with and be guided in one of said openings, the dimensions of the last mentioned opening with respect to the said valve member being such that this opening is not at any time entirely closed by the valve member so that some of the fluid is allowed to flow through the opening and past the valve member under any circumstances, a temperature responsive element connected to said valve member to control its position relative to said related opening, a stem on said temperature responsive element adjustably mounted in the cap to permit adjustment of said element and valve member relative to the related opening, said stem extending to the outside of said cap so as to be accessible for being adjusted, a cover on said cap normally concealing the extended stem portion, a flexible diaphragm overlying the other end of said housing providing one wall of said outlet chamber, a casing mounted on said housing over said diaphragm, valve means secured to said diaphragm arranged to control the flow through the other wall opening, a spring disposed in the casing to urge the diaphragm and the connected valve means into a valve opening position, and means in the casing to adjust the tension of said spring.

2. A valve structure comprising a substantially tubular housing open at its ends, a removable cap on one end of said housing, a fluid inlet chamber within said housing including spaced walls each having an opening therein communicating with an outlet chamber within said housing, a valve member to cooperate with and be guided in one of said openings, the dimensions of the last mentioned opening with respect to the said valve member being such that this opening is not at any time entirely closed by the valve member so that some of the fluid is allowed to flow through the opening and past the valve member under any circumstances, a temperature responsive element connected to said valve member to control its position relative to said related opening, a stem on said temperature responsive element adjustably mounted in the cap to permit adjustment of said element and valve member relative to the related opening, a flexible diaphragm overlying the other end of said housing providing one wall of said outlet chamber, a casing mounted on said housing over said diaphragm, a valve seat surrounding the other opening in said spaced chamber walls, valve means secured to said diaphragm arranged to cooperate with said valve seat to control the flow through its related wall opening, said valve means including a valve disc and a stem, a spring disposed in the casing to urge the diaphragm and the connected valve means into a valve opening position, and means in the casing adjustable to vary the tension of said spring.

3. A valve structure comprising a housing open at its ends, a cap on one end of said housing, a fluid inlet chamber within said housing including spaced walls having axially aligned openings of different diameters therein communicating with an outlet chamber within said housing, a valve member to cooperate with and be guided in the larger of said openings, the dimensions of the last mentioned opening with respect to the said valve member being such that this opening is not at any time entirely closed by the valve member so that some of the fluid is allowed to flow through the opening and past the valve member under any circumstances, a temperature responsive element connected to said valve member to control its position relative to said related opening, a stem on said temperature responsive element adjustably mounted in the cap to permit adjustment of said element and valve member relative to the related openings, a flexible diaphragm overlying the other end of said housing providing one wall of said outlet chamber, a casing mounted over said diaphragm, valve means secured to said diaphragm arranged to control the flow through the smaller of said wall openings, said valve means including a valve disc and a stem, the disc being of a diameter to be passed freely through the larger of said openings during assembly, a spring disposed in the casing to urge the diaphragm and the connected valve means into a valve opening position, and means to adjust the tension of said spring.

4. A valve structure for controlling the flow of a fluid comprising a substantially tubular housing having side walls and closed at its ends, the housing having substantially diametrically opposed inlet and outlet openings in its side walls intermediate its ends, a valve controlled chamber including upper, lower and end walls within the housing extending from and in direct sealed communication with the inlet opening and with the said end wall thereof spaced from and closely adjacent the outlet opening, the upper wall of said chamber having a valve guide opening therein, a valve positioned in said opening, a temperature responsive operable means within the housing attached to the valve for moving the same within the opening, the dimensions of the said opening with respect to the valve being such that the opening is not at any time entirely closed by the valve whereby some fluid is allowed to flow through the opening and past the valve under any circumstances, and the fluid flowing from the said chamber to the outlet passing by and some of the fluid contacting the end wall of the chamber prior to passing through the outlet opening.

5. A valve as defined in and by claim 4 wherein the lower wall of the chamber is provided with an opening substantially in alignment with the opening in the upper wall, a casing attached to the end of the housing, pressure regulating means within the casing and including a valve for opening and closing the last mentioned opening whereby fluid passing through this last mentioned opening toward the outlet flows past and in part contacts the end wall of the said chamber prior to passing through the outlet opening.

6. A valve structure for controlling the flow of a fluid comprising a housing having side and end walls, the housing having inlet and outlet openings in the side walls, a valve controlled chamber including upper, lower and end walls within the housing extending from and in communication with the inlet opening with the said end wall thereof spaced from the outlet opening, the upper wall of said chamber having a valve guide opening therein, a valve member of less diameter than the diameter of said valve guide opening positioned in said valve guide opening and allowing a flow of fluid through said guide opening, and a temperature responsive operable means within the housing attached to the valve member for moving the same within and through said valve guide opening.

7. A valve structure for controlling the flow of a fluid comprising a housing having side and end walls, the housing having inlet and outlet openings in the side walls, a valve controlled chamber including upper, lower and end walls within the housing extending from and in communication with the inlet opening with the said end wall thereof spaced from the outlet opening, the upper wall of said chamber having a valve guide opening therein, a valve member of less diameter than the diameter of said valve guide opening positioned in said valve guide opening and allowing a flow of fluid through said guide opening, said valve member comprising spaced discs and angularly disposed connecting webs with the ends of the webs disposed in alignment with the peripheries of said spaced discs, and a temperature responsive operable means within the housing attached to said valve member for moving the same within and through the opening in the upper wall of said chamber.

GEORGE W. BORNQUIST.

REFERENCES CITED

The following references are of record in the file of this patent:

UNITED STATES PATENTS

| Number | Name | Date |
|---|---|---|
| 528,727 | Lamplough | Nov. 6, 1894 |
| 753,557 | Dunham | Mar. 1, 1904 |
| 1,067,409 | Daniel | July 15, 1913 |
| 1,739,723 | King | Dec. 17, 1929 |
| 1,788,765 | Hamblin et al. | Jan. 13, 1931 |
| 1,877,510 | Hughes | Sept. 13, 1932 |
| 2,020,075 | Meagher | Nov. 5, 1935 |
| 2,021,881 | Askin | Nov. 26, 1935 |
| 2,086,037 | Kronmiller | July 6, 1937 |
| 2,205,349 | Dube et al. | June 18, 1940 |
| 2,206,905 | Leonard | July 9, 1940 |
| 2,228,767 | Johnsson | Jan. 14, 1941 |
| 2,285,305 | Reid | June 2, 1942 |

FOREIGN PATENTS

| Number | Country | Date |
|---|---|---|
| 523,879 | France | Apr. 30, 1921 |